Feb. 14, 1939.  W. M. CHARMAN  2,147,147
HOT TOP FOR BIG-END-DOWN INGOT MOLDS
Filed April 7, 1938.  2 Sheets-Sheet 1
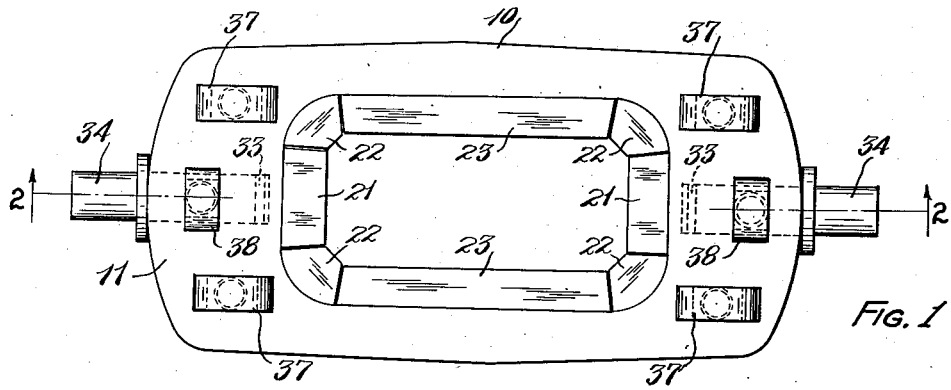
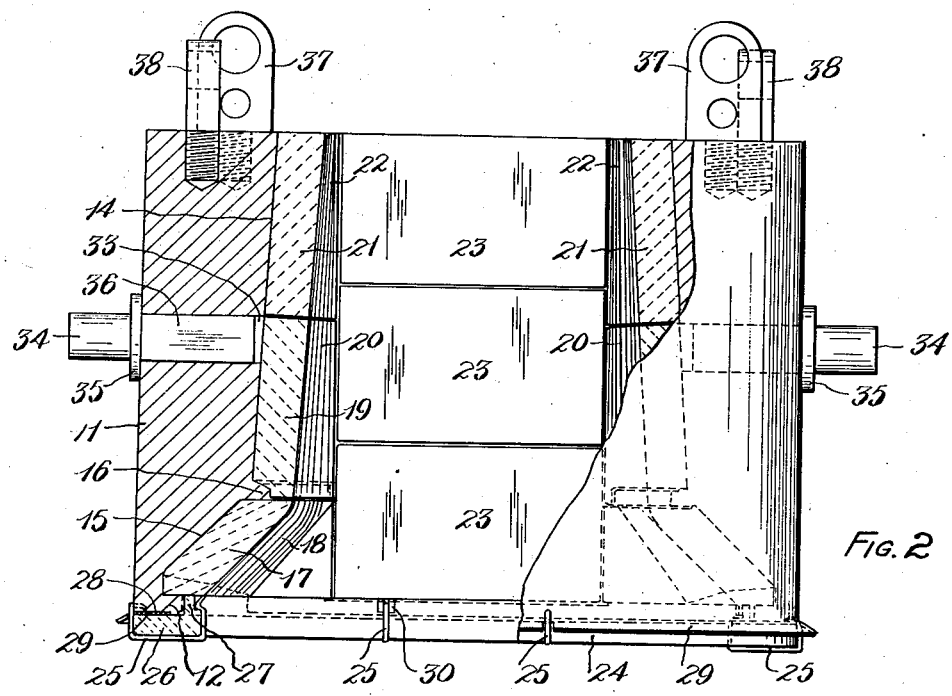
INVENTOR.
WALTER M. CHARMAN
BY
Kwis, Hudson & Kent
ATTORNEYS.

Feb. 14, 1939.   W. M. CHARMAN   2,147,147
HOT TOP FOR BIG-END-DOWN INGOT MOLDS
Filed April 7, 1938   2 Sheets-Sheet 2
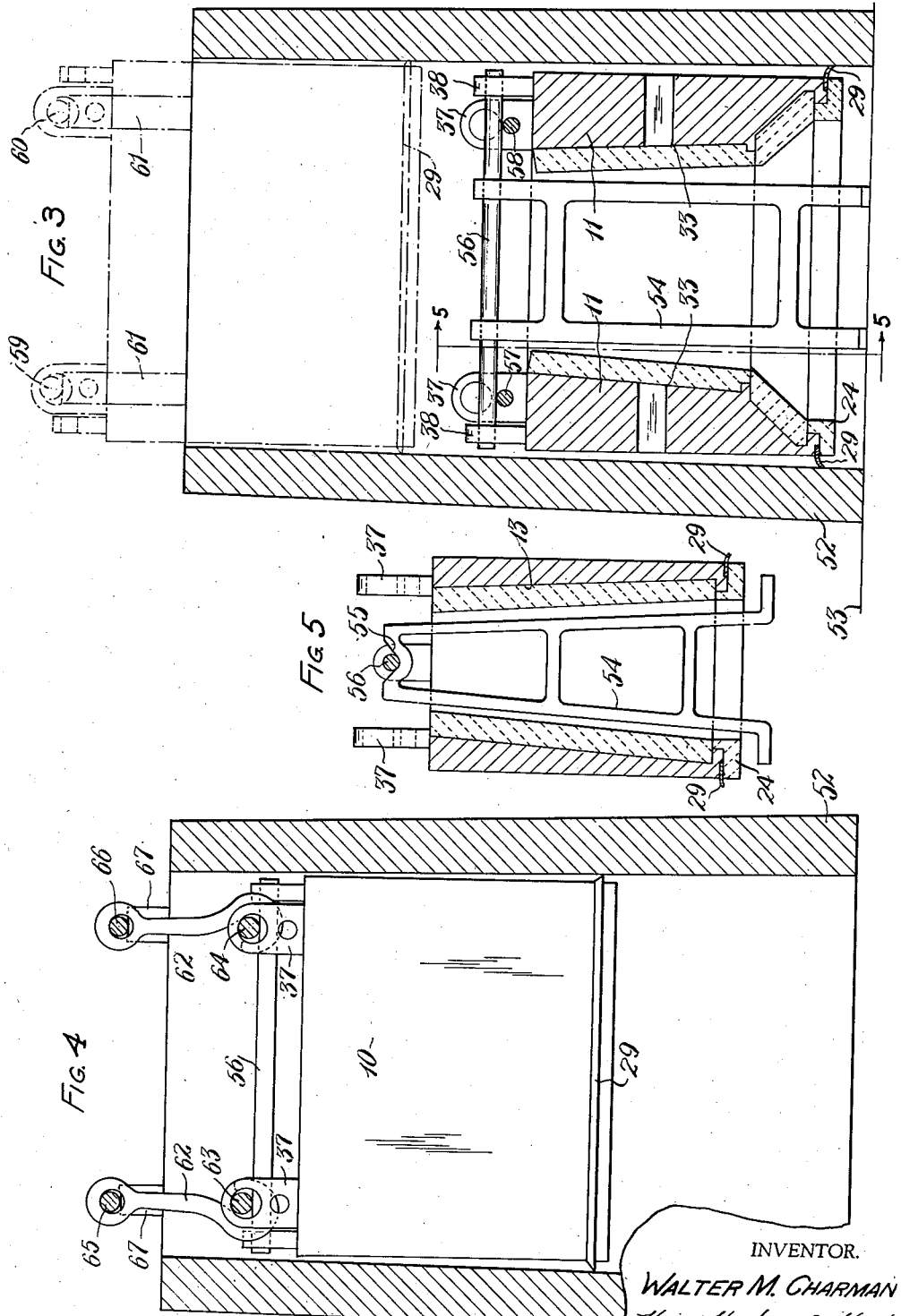
INVENTOR.
WALTER M. CHARMAN
ATTORNEYS.

Patented Feb. 14, 1939

2,147,147

UNITED STATES PATENT OFFICE 2,147,147

HOT TOP FOR BIG-END-DOWN INGOT MOLDS

Walter M. Charman, Shaker Heights, Cleveland, Ohio

Continuation of application Serial No. 49,936, November 15, 1935, which is a division of application Serial No. 681,541, July 21, 1933. This application April 7, 1938, Serial No. 200,751

13 Claims. (Cl. 22—147)

This invention relates to improvements in hot tops for big-end-down ingot molds, and has reference not only to the particular structure of hot top but also to a method of assembling hot tops upon such molds.

The hot tops used in connection with the invention are composite hot tops, that is they are made up of metal casing lined on its inner and lower sides with refractory insulating material. The present application is a continuation of my copending application Serial No. 49,936, filed November 15, 1935, and that application is a division of my application Serial No. 681,541, filed July 21, 1933.

One of the objects of the invention is the provision of a novel method of assembling or mounting a hot top in or upon a big-end-down mold, where the hot top is equipped with wiper strips of the general type shown in Patent 1,804,207, issued May 5, 1931, to Harry J. Darlington and myself.

Another object of the invention is the provision of a special form of removable trunnions adapted for use in connection with a hot top of the character above referred to.

Other objects and features of novelty will appear as I proceed with the description of that embodiment of the invention which, for the purposes of the present application, I have illustrated in the accompanying drawings, in which Fig. 1 is a plan view of a hot top which may be employed in connection with the invention.

Fig. 2 is a side elevational view, partly in vertival section on the line 2—2 of Fig. 1.

Fig. 3 is a vertical sectional view of a big-end-down mold with a hot top positioned therein, illustrating a method which I employ for assembling in this type of mold a hot top equipped with wiper strips.

Fig. 4 is a similar view showing the hot top suspended from the mold entirely within the walls of the mold, and Fig. 5 is a cross sectional view taken substantially on the line 5—5 of Fig. 3.

The hot top casing illustrated in the drawing is preferably an iron casting, and comprises side walls 10 and end walls 11. The hot top is of the type which is adapted to extend down into the mold and to float upon the ingot when poured, the perimeter of the hot top casing having the same contour as the inner wall of the mold, but being of such size as to afford a small clearance all around. Running around the bottom of the casing there is an internal ledge 12, which is preferably of approximately the same width throughout its extent.

The outer surfaces of walls 10 and 11 are preferably vertical, as shown. The inner surfaces of the side walls 10 however incline upwardly toward each other, as illustrated at 13 in Fig. 5. The walls 11 at the ends are formed with internal inclinations of at least two different angles with the vertical, and the end walls, except at the bottom, may be quite thick. In the construction illustrated there are two such end inclinations 14 and 15, the upper one corresponding substantially with the inclination 13 on the side walls, while the lower inclination 15 makes a considerable angle with the vertical. The inclinations 14 and 15 meet at an intermediate ledge 16, which extends inwardly from each end wall of the casing. The middle portion of this ledge is spaced both vertically and horizontally from the ledge 12, although at its ends the ledge 16 curves into the same vertical planes approximately with the side portions of ledge 12.

The ledge 12 supports at each end of the casing a plurality, preferably two, preformed lining blocks 17 and 18 which fit the inner walls of the casing, rest upon the ledge 12, and engage beneath or just clear the ledges 16. The outer side edges of both blocks 17 and 18 are preferably beveled off.

Above the ledges 16 and supported thereby are blocks 19 and 20, preferably provided with downwardly extending lips overhanging the ledges 16 and substantially meeting the upper edges of blocks 17 and 18, so as to protect the ledges. Above the blocks 19 and 20 are additional blocks 21 and 22. The blocks 19 and 21 are identical in size and form, while the blocks 22 are smaller than the blocks 20, the blocks 20 and 22 being tapered toward their upper ends. It will be understood, of course, that a greater or lesser number of lining blocks may be employed to cover the end portion of the casing, but in the case of large hot tops it will generally be desirable to employ more than one course above the ledge 16 because of the inconvenience and practical difficulties presented by the manufacture of large size lining blocks.

The sides of the casing are lined with blocks 23, which are of uniform width throughout their extent, like the blocks 19 and 21, and are beveled on their side edges in the same way as are the blocks 19 and 21. When all of the blocks 17 and 18 are in position the operator may slide the two lower blocks 23 downwardly into position. All of these blocks are then locked against falling inwardly, because of the beveled edges. Other forms of interfitting edges could be employed, but the beveled edges are preferred because of their simplicity. The operator next places in position the corner blocks 20 at one end of the casing, supporting them upon the ledge 16, after which he slides the blocks 19 down between them, thereby locking these three end blocks against inward movement, the lower side blocks 23 being longer than the blocks 17 and 18 so that they project upwardly well beyond the bases of the blocks 19 and therefore constitute abutments on the side towards the middle of the hot top. The operator then proceeds in the same way to place in position the blocks 19 and 20 at the opposite end of the casing, after which the second course of side blocks 23 are slid downwardly into place. These second course blocks 23 project upwardly far enough beyond the blocks 19 and 20 to constitute temporary abutments for the placing of the two sets of end blocks 21 and 22 in the same way that the lower side blocks acted to temporarily hold the end blocks 19 and 20. Slipping the upper course blocks into position then completes the assembly, except for such cementing of joints as may be necessary, and except for the mounting of the bottom ring or other covering for the lower ledge 12.

As a lining for the lower ledge 12 I prefer to employ a single bottom ring 24 of refractory material of the general character disclosed in U. S. Patent 1,956,895, issued May 1, 1934, to Philip R. Ward and myself, and to hold this ring in position by spring clips 25 of the character disclosed in Patent 1,949,292, issued February 27, 1934, to Gustave A. Peterson and myself. This ring comprises a flat horizontal portion 26 covering the lower surface of the ledge 12, and an upwardly extending flange 27 covering the inner side of the ledge. The ledge is preferably recessed at 28 to receive a wiper strip 29 which projects beyond the perimeter of the casing and is flexible so as to wipe against the interior walls of an ingot mold. The projecting part of the wiper strip is deflected downwardly in order that the wiping action referred to may take place when the hot top is raised relative to the mold with which it is used.

One end of the clip 25 rests in a shouldered cavity 30 in the flange 27 of the ring. The other end of the clip is sprung into an opening in the outer side of the casing.

In the thick portions of the casing at the ends thereof, I form aligned openings 33 which are preferably of square or other non-circular cross section, and may extend entirely through the casing walls. Trunnions 34 are removably mounted in these openings. They have outer portions of circular cross section, collars 35 to limit the movement of the trunnions into the casing, and inner portions 36 of the same cross sectional size and shape, approximately, as the openings 33. The openings 33 are horizontal, are located in a vertical plane of symmetry of the casing, and at the same level approximately as the center of gravity of the casing or of the composite hot top. Hence the hot top, when mounted upon the trunnions, may be turned over for inspection or repair with very little effort. The presence of trunnions of the ordinary kind on a hot top casing would prevent its being assembled into or upon a big-end-down mold in the manner presently to be described but this difficulty is overcome by my construction, since the trunnions may be removed entirely at such times. In fact they are used only when the hot top is being serviced between heats. Moreover, it is not necessary to provide a separate set of trunnions for each hot top, as one set may be used interchangeably in an entire series of hot tops.

For convenience in handling I mount two sets of threaded posts 37 and one set of threaded posts 38 in threaded openings in the top of the casing, the thickness of the end walls of the casing making it readily possible to do this. These posts are all provided with holes into which lifting bars, hooks, or other handling means may be inserted, the holes of each pair of posts being arranged in alignment so that they may receive lifting bars if desired.

When my hot top is to be assembled upon a big-end-down mold, I raise it up through the bottom of the mold to pouring position, instead of lowering it to that position from above in the conventional manner. This novel method of procedure is illustrated in Figs. 3, 4 and 5.

In these figures a big-end-down hot top is shown at 52, resting upon a floor surface indicated at 53. Upon the same floor surface I support a chair or horse 54 within the walls of the mold, this horse being formed at its upper end with spaced V-shaped sockets 55 adapted to receive a supporting bar 56 mounted in the aligned posts 38 at the ends 11 of the hot top casing. The horse 54 is so made and proportioned that it can extend upwardly through the hot top to engage bar 56. The suspension of the hot top above the floor surface is desirable in order to relieve the refractory bottom ring 24, and the fastenings by which it is mounted, of the weight of the iron casing and the upper linings.

In carrying out this method of assembly, the hot top is first mounted upon the horse 54, as illustrated in Figs. 3 and 5, after which the mold 52 is lowered into position around the hot top, as indicated in Fig. 3. Crane hooks are then passed beneath the bars 57 and 58, mounted in the lower openings of posts 37, and the hot top is raised to whatever position may be desired, the wiper strips 29 wiping against the internal mold surfaces as the hot top ascends. Assuming that the dotted line position of the hot top in Fig. 3 is the predetermined pouring position, the raising of the hot top is interrupted at that level, the bar 56 is removed, and bars 59 and 60 are placed in the upper openings of the posts 37. These bars are longer than the bars 57 and 58 and overhang the side walls of the mold 52. Wooden or other blocks 61 are then inserted between the top of the mold and the ends of bars 59 and 60, after which the lifting hooks are disconnected and the weight of the hot top is supported upon the mold. The mold may then be lifted with a suitable crane to a height sufficient to clear the horse 54, after which the crane may be operated to transport the mold with its hot top attached thereto to the station at which it is to be located when the metal is poured.

During pouring of the ingot the wiper strip 29 prevents the flow of metal upwardly around the hot top in a manner well understood in the art. After the conclusion of the pouring operation the blocks 61 are knocked out or otherwise removed, and the hot top floats upon the ingot in a manner also well understood in the art.

In Fig. 4 I have shown the hot top supported in a pouring position entirely within the walls of the mold 52, the difference in elevation of the hot top between this figure and the dotted line representation in Fig. 3 serving to indicate the wide variation in the size of the ingots which may be produced with a given set of apparatus. In this case the hot top is raised from its primary position at the bottom of the mold by means of hooks applied to the bar 56, or otherwise, after which hooks 62 are caused to engage bars 63 and 64 mounted in the upper openings of posts 37, these hooks having eyes at their upper extremities through which are threaded bars 65 and 66 that are long enough to overhang the walls of the mold. Wooden or other blocks 67 are then positioned between the bars 65 and 66 on the one hand and the upper end of the mold on the other hand, whereby the weight of the hot top is taken by the mold, and the latter with the hot top thus supported upon it may be raised and transported in the same manner as stated in connection with the description of Fig. 3. The lengths of the hooks 62 and the sizes of the blocks 67 may of course be varied in order to provide different pouring elevations for the hot top.

Variations from the described structure may be employed. Accordingly I desire to be understood that the scope of the invention is to be regarded as defined exclusively by the appended claims, rather than by the foregoing description or the accompanying illustration.

Having thus described my invention, I claim:

1. A method of assembling hot tops in big-end-down molds, which comprises causing the lower end of the mold and the upper end of the hot top to approach and pass each other, and continuing the movement in that direction until the desired relative position for pouring is reached, and then supporting the hot top at that position.

2. A method of assembling hot tops in big-end-down molds, which comprises lowering the mold over the hot top onto a supporting surface, and then raising the hot top to the desired elevation and supporting it at said elevation.

3. A method of assembling hot tops equipped with wiper strips in big-end-down molds, which comprises causing the lower end of the mold and the upper end of the hot top to approach and pass each other, and continuing the movement in that direction until the desired relative position for pouring is reached, and then supporting the hot top upon the mold at that position.

4. A method of assembling hot tops equipped with wiper strips in big-end-down molds, which comprises lowering the mold over the hot top onto a supporting surface, and then raising the hot top to the desired elevation, and supporting it at said elevation.

5. A method of assembling hot tops equipped with wiper strips in big-end-down molds, which comprises supporting the hot top above the supporting surface for the mold, lowering the mold downwardly over the hot top onto the supporting surface, and then raising the hot top to the desired elevation and supporting it at that elevation.

6. A method of assembling hot tops in big-end-down molds, which comprises suspending the hot top above a floor surface by means of a horse resting upon the floor and extending upwardly through the hot top, lowering the mold downwardly over the hot top onto the floor surface, lifting the hot top off the horse and raising it within the mold to the desired level, supporting it upon the mold at that level, and then lifting the mold with the hot top attached thereto to clear said horse and transporting it to the metal pouring position.

7. In a hot top of the floating type, a wiper strip extending outwardly from the hot top near the lower end thereof, said wiper strip having a downwardly inclined outer portion adapted to flex as the strip moves upwardly along the inner wall surface of the big-end-down mold.

8. In combination, a mold member of the big-end-down type, a hot top member with external dimensions slightly smaller than the internal dimensions of the mold member and of the same contour, and a flexible wiper strip carried by one of said members, said wiper strip engaging the other of said members as the hot top is raised in the mold and being thereby flexed to bear resiliently against the surface of the other member.

9. In a hot top, a casing, upwardly extending posts mounted at the upper end of the casing having aligned openings therein for the reception of a supporting rod, and a second pair of upwardly extending posts mounted at the upper end of the casing having aligned openings therein at right angles to the aligned openings in the first named pair of posts and at a different level.

10. In a hot top for big-end-down ingot molds, a metal casing, opposite walls of said casing having aligned openings therein arranged on a horizontal axis near the level of the center of gravity of the hot top, said openings being of noncircular cross section and being adapted to receive trunnions removably.

11. In a floating hot top, a metal casing having two opposed walls of greater thickness than the remaining walls, said thick walls having aligned openings therein positioned approximately at the level of the center of gravity of the hot top, and trunnions removably mounted in said openings.

12. In a floating hot top, a metal casing, opposite walls of said casing having aligned openings therein near the level of the center of gravity of the hot top, and trunnions removably mounted in said openings, said trunnions having collars thereupon engaging with the outer surfaces of the casing when the trunnions are in operative position.

13. In a floating hot top for ingot molds, a metal casing, opposite walls of said casing having aligned openings therein arranged on a horizontal axis near the level of the center of gravity of the hot top, and trunnions removably mounted in said openings.

WALTER M. CHARMAN.